(12) United States Patent
Nakajima et al.

(10) Patent No.: US 11,353,830 B2
(45) Date of Patent: Jun. 7, 2022

(54) SERVO CONTROL METHOD

(71) Applicant: OMRON Corporation, Kyoto (JP)

(72) Inventors: Kenji Nakajima, Hannan (JP); Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 229 days.

(21) Appl. No.: 16/644,547

(22) PCT Filed: Jan. 18, 2019

(86) PCT No.: PCT/JP2019/001504
§ 371 (c)(1),
(2) Date: Mar. 5, 2020

(87) PCT Pub. No.: WO2019/171781
PCT Pub. Date: Sep. 12, 2019

(65) Prior Publication Data
US 2020/0264568 A1      Aug. 20, 2020

(30) Foreign Application Priority Data

Mar. 7, 2018   (JP) .............................. JP2018-040840

(51) Int. Cl.
*G05B 11/36*          (2006.01)
*G05B 11/32*          (2006.01)
(52) U.S. Cl.
CPC .............. *G05B 11/36* (2013.01); *G05B 11/32* (2013.01)
(58) Field of Classification Search
CPC ................................. G05B 11/36; G05B 11/32
USPC ......................................... 318/560, 561, 562
See application file for complete search history.

(56) References Cited

U.S. PATENT DOCUMENTS 7,345,443 B2 *   3/2008   Yoshiura .............. G05B 19/404
                                                        318/437
8,736,217 B2 *   5/2014   Iwashita ............. H02P 23/0077
                                                        318/568.1
9,998,053 B2 *   6/2018   Miklosovic ............ G05B 13/02

FOREIGN PATENT DOCUMENTS

| EP | 1291747 A1 | 3/2003 |
|---|---|---|
| JP | 2001-249720 A | 9/2001 |
| JP | 2006-18431 A | 1/2006 |
| JP | 2006-254630 A | 9/2006 |
| JP | 2012-234452 A | 11/2012 |

OTHER PUBLICATIONS

English translation of the International Search Report("ISR") of PCT/JP2019/001504 dated Apr. 23, 2019.
English translation of the Written Opinion("WO") of PCT/JP2019/001504 dated Apr. 23, 2019.
Extended European search report (EESR) dated Oct. 14, 2021 in a counterpart European patent application.

* cited by examiner

*Primary Examiner* — David Luo
(74) *Attorney, Agent, or Firm* — Metrolex IP Law Group, PLLC

(57) ABSTRACT

A servo control method includes a step of adjusting a feedback gain used in feedback control of a controlled object, the feedback control being performed based on difference information between a target value concerning an instruction and a feedback signal from the controlled object, so that the controlled object is operated by following the instruction, and a step of adjusting a feedforward gain used in feedforward control of the controlled object after the adjustment of the feedback gain.

3 Claims, 3 Drawing Sheets

SERVO CONTROL METHOD

TECHNICAL FIELD

The present invention relates to a servo control method for performing feedback control and feedforward control.

BACKGROUND ART

In order to move a controlled object in such a manner that it tracks a target trajectory, feedback control is generally used. For example, in an articulated robot, a control device of the robot uses feedback control to control a servo motor of each joint axis, so that the position of a hand unit of the robot tracks a preset (taught) target trajectory. However, since a response lag inevitably occurs in each servo motor in general feedback control, there is a problem that the actual trajectory of the robot deviates from the target trajectory. To address such a problem, there is a technique that adopts feedforward control to perform control so that the position of the robot may consistently match the instructed position.

As a conventional technology for performing feedback control and feedforward control, there has been a servo control device (Patent Document 1, for example) including feedforward gain-changing means capable of automatically setting the feedforward gain of a feedforward controller that minimizes the maximum absolute value of deviation between a target instruction and motor output.

CITATION LIST

Patent Literature

PTL 1: Japanese Patent Laid-Open No. 2006-18431

SUMMARY OF INVENTION

Technical Problem

However, in the above conventional technology, no consideration has been given as to how to adjust the balance between feedback gain and feedforward gain to improve trajectory trackability.

The present invention has been made in view of such a problem, and aims to provide a servo control method that enables the operation of a controlled object to follow an instruction effectively while balancing feedback gain and feedforward gain.

Solution to Problem

In the present invention, the following configuration is adopted to solve the above problem. One aspect of the present invention is a servo control method. The servo control method includes a step of adjusting a feedback gain used in feedback control of a controlled object, the feedback control being performed based on difference information between a target value concerning an instruction and a feedback signal from the controlled object, so that the controlled object is operated by following the instruction, and a step of adjusting a feedforward gain used in feedforward control of the controlled object after the adjustment of the feedback gain.

According to the servo control method of the present invention, the feedforward gain is adjusted after adjusting the feedback gain. This method is advantageous in the following points. That is, in a case of adjusting gain based on settling time, if the feedforward gain is first set larger than the feedback gain, the settling time arrives before the feedback gain becomes sufficiently large. Hence, a favorable trajectory trackability or stability cannot be achieved. According to the servo control method of the present invention, the above situation can be avoided. That is, it is possible to make the operation of the controlled object follow the instruction effectively (improve trajectory trackability).

The servo control method of the present invention may adopt a configuration in which the adjustment of the feedforward gain is stopped when torque applied to the controlled object is saturated during the operation of the controlled object. Since an increase in the feedforward gain in a torque saturated state does not contribute to improvement in trajectory trackability, the torque saturation is regarded as a condition to stop adjustment of the feedforward gain.

The servo control method of the present invention may adopt a configuration in which the adjustment of the feedforward gain is stopped when vibration is detected during stoppage of the controlled object. By stopping adjustment of the feedforward gain in response to detection of vibration during stoppage of the controlled object, a needless rise in the feedforward gain can be avoided.

The servo control method of the present invention may adopt a configuration in which in a case where speed control and torque control are performed regarding the controlled object, a feedforward gain concerning the torque control is adjusted after adjusting a feedforward gain concerning the speed control. Since feedforward control of speed is less likely to generate vibration than feedforward control of torque, feedforward control of speed is performed first.

Advantageous Effects of Invention

The present invention enables the operation of a controlled object to follow an instruction effectively while balancing feedback gain and feedforward gain.

DESCRIPTION OF EMBODIMENTS

Application Example

Figure 1:
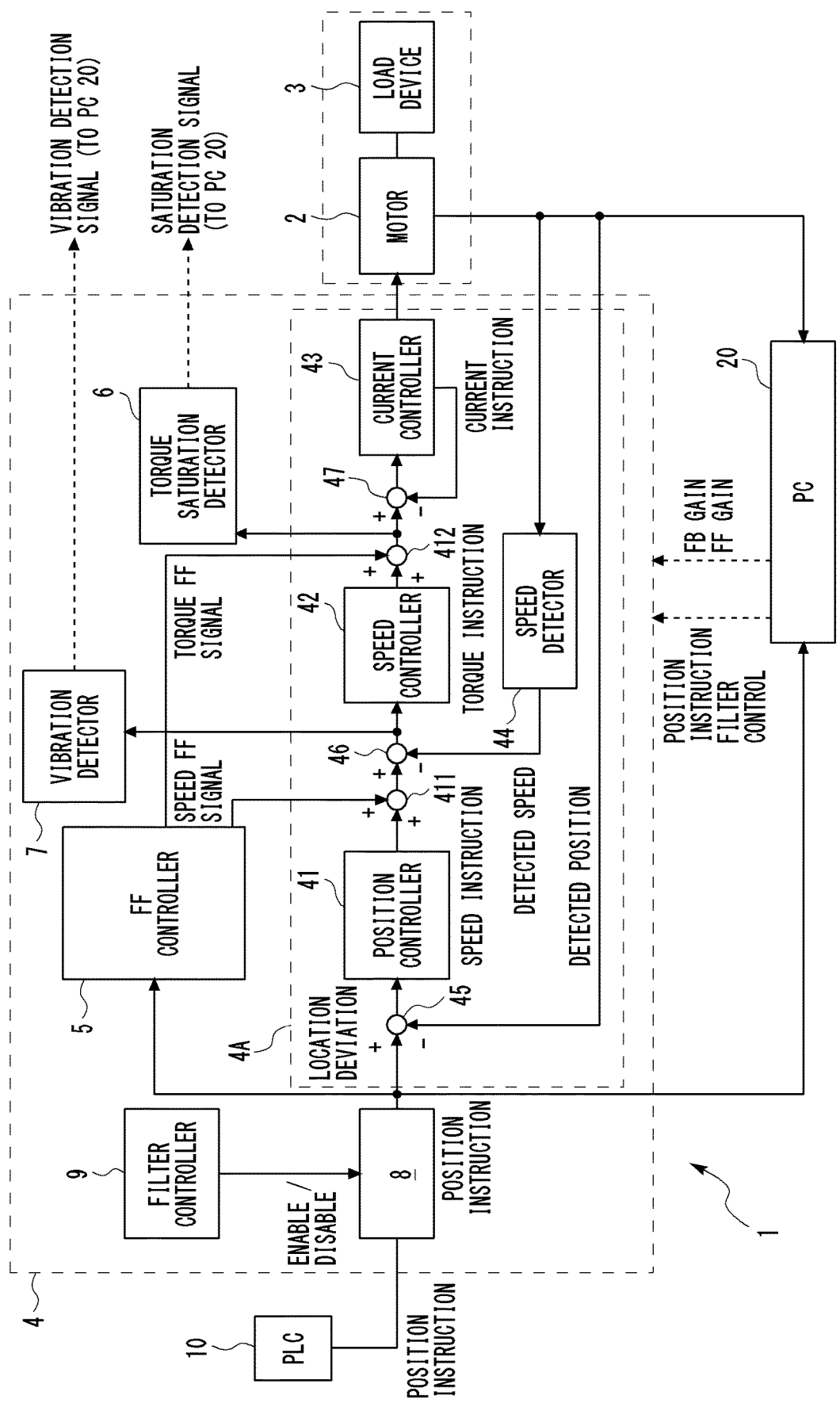
FIG. 1 is a diagram illustrating a schematic configuration of a servo control system of the present invention.

FIG. 1 is a schematic configuration diagram of a servo control system of an embodiment of the present invention. In FIG. 1, a servo control system 1 includes a motor 2 and a load device 3 as a controlled object 11, a control device (servo driver 4) that controls the controlled object 11, a programmable logic controller (PLC) 10, and a personal computer (PC) 20 that adjusts feedback gain and feedforward gain, for example. In the control system, the servo driver 4 controls driving of the motor 2 and the load device 3 as the controlled object 11, so that the controlled object 11 follows an operation instruction signal generated in the PLC 10.

The servo driver 4 supplies a power signal corresponding to a position instruction from the PLC 10 to the controlled object 11, and controls the operation of the controlled object 11. The servo driver 4 includes a feedback controller (FB controller) 4A. The FB controller 4A receives a feedback signal related to the operation of the controlled object 11, and performs feedback control on a position loop, speed loop, and torque loop, so that the actual position, speed, and torque of the controlled object 11 follow a target value according to the instruction. Note, however, that not all of the position, speed, and torque need to be controlled, and it is only required that at least one of the position, speed, or torque be controlled.

The servo driver 4 also includes a feedforward (FF) controller 5. A position instruction is input into the FF controller 5. The FF controller 5 generates an FF signal (signal whose dimension has been adapted to that of instruction) reflecting a feedforward gain, and inputs it into the FB controller 4A.

In the servo control system 1, to control the operation of the controlled object 11, the feedback gain (FB gain) is adjusted, and then the feedforward gain (FF gain) is adjusted. Specifically, feedback control is performed by use of a closed loop (feedback loop) related to position, speed, and torque formed in the servo driver 4. The FB gain used for the feedback control is adjusted by use of the PC 20, and is set in the FB controller 4A. The adjustment is made by using a position instruction and a corresponding feedback signal, for example, to raise the FB gain so as to minimize the settling time for the position instruction. When the FB gain reaches a predetermined value after the rise, adjustment of the FB gain is completed. Note, however, that the FB gain adjustment method and adjustment completion condition can be set as appropriate.

After completion of the FB gain adjustment, the FF gain is adjusted by use of the PC 20. In the embodiment, as examples of FF gain, feedforward gain related to speed control (referred to as speed FF gain) and torque feedforward gain related to torque control (referred to as torque FF gain) are adjusted. The speed FF gain and the torque FF gain adjusted by the PC 20 are set in the FF controller 5. The FF controller 5 uses the speed FF gain to generate and output a speed instruction (speed FF signal) related to feedforward control. Additionally, the FF controller 5 uses the torque FF gain to generate and output a torque instruction (torque FF signal) related to feedforward control. The speed FF signal is added to a speed instruction from a position controller 41 in an adder 411 to obtain a speed target value. Additionally, the torque FF signal is added to a torque instruction from a speed controller 42 in an adder 412 to obtain a torque target value. Thus, feedforward control on speed and torque is performed. That is, the servo control system 1 (servo driver 4) can perform feedback control and feedforward control on the controlled object 11.

Adjusting the FF gain after adjusting the FB gain is advantageous in the following points. That is, considering the robustness of the control system, it is desirable that both the FB gain and the FF gain be high. Here, assume that the FF gain is adjusted first to set a large FF gain, and then the FB gain is adjusted thereafter. In this case, there has been a problem that the settling time arrives before the FB gain has not risen sufficiently.

Against this background, in the servo control system 1, the FB gain is adjusted first, and then the FF gain is adjusted thereafter. With this method, since the FF gain is adjusted in a state where the FB gain has risen to a level appropriate for the system, it is possible to adjust the magnitude of each of the FB gain and the FF gain to a desired magnitude. As a result, it is possible to improve trajectory trackability by feedforward control, and obtain the servo control system 1 having a favorable robustness.

Embodiment

As described above, the servo control system 1 illustrated in FIG. 1 includes the controlled object 11 (motor 2 and load device 3), the servo driver 4, the PLC 10, and the PC 20. The servo driver 4 is electrically connected to the PLC 10 and the controlled object 11. Additionally, the servo driver 4 is capable of communicating with the PC 20. The communication may be wired communication or wireless communication.

In the servo control system 1, the servo driver 4 controls driving of the motor 2 and the load device 3, so that the operation of the controlled object 11 (motor 2 and load device 3) follows the position instruction (position target value) input from the PLC 10. Specifically, the servo driver 4 has multiple closed loops that control the rotation angle (position) of the motor 2, the rotation speed (moving speed) of the motor 2, and the generated torque of the motor 2, and can perform feedback control using the closed loops. Note, however, that feedback control does not have to be performed on all of the position, speed, and torque, and feedback control can be performed on at least a selected one of the position, speed, and torque.

Here, examples of the load device 3 included in the controlled object 11 include various machine devices (e.g., arm or conveying device of industrial robot). Additionally, the motor 2 is incorporated in the load device 3 as an actuator for driving the load device 3. For example, the motor 2 is an AC servo motor.

An unillustrated encoder (position detector) is attached to the motor 2, and the encoder feeds back a parameter signal concerning the operation of the motor 2 to the FB controller 4A. The parameter signal (FB signal) to be fed back includes positional information on the rotation angle (position) of a rotation axis of the motor 2, speed information on the rotation speed (moving speed) of the rotation axis, and the like. Note that the controlled object 11 may include multiple motors 2, and in this case, the load device 3 has a so-called multi-axis configuration which is a configuration whose driving is controlled by the multiple motors 2.

Note that the servo driver 4 calculates an instruction value concerning servo control for driving of the motor 2, that is, the operation of the motor 2, and also supplies a drive current to the motor 2, so that the operation of the motor 2 follows the instruction value. AC power transmitted from an unillustrated AC power supply to the servo driver 4 is used as the supply current. Note that while the servo driver 4 of the embodiment is a type that receives a three-phase alternating current, the servo driver 4 may instead be a type that receives a single-phase alternating current.

Additionally, the FB controller 4A uses the speed FF signal and torque FF signal input from the FF controller 5 to perform speed control reflecting the speed FF gain and torque control reflecting the torque FF gain. Note that the servo driver 4 and the PLC 10 include a combination of electric or electronic circuits and an integrated circuit (e.g., ASIC or FPGA). Note, however, that a part of the operation performed by these components can be performed by program (software) processing using a processor and a memory. The PC 20 is one example of an information processing device, and a general or dedicated computer can be applied as the PC 20.

<Servo Control>

Next, servo control by the servo driver 4 will be described. Servo control of the embodiment includes a feedback system using the position controller 41, the speed controller 42, and a current controller 43 provided in the servo driver 4.

The position controller 41 performs proportional control (P control), for example. Specifically, the servo driver 4 includes a subtractor 45 that calculates a location deviation (one example of difference information) which is deviation between a position instruction from the PLC 10 and a detected position from the encoder (not shown), and receives input of the location deviation output from the subtractor 45. The position controller 41 multiplies the location deviation by a predetermined position proportional gain to calculate and output a speed instruction.

The speed controller 42 performs proportional-plus-integral control (PI control), for example. Specifically, a subtractor 46 is provided in a stage preceding the speed controller 42. The speed instruction and a detected speed calculated by a speed detector 44 by differentiation of detected positional information are input into the subtractor 46. The subtractor 46 calculates and outputs a speed deviation (one example of difference information) which is deviation between the speed instruction and the detected speed. The speed deviation is input into the speed controller 42. The speed controller 42 multiplies an integral quantity of the speed deviation by a predetermined speed integral gain, and multiplies the sum of the calculation result and the speed deviation by a predetermined speed proportional gain. With this method, a torque instruction is obtained, and the torque instruction is output from the speed controller 42. Note that the speed controller 42 may perform P control instead of PI control.

The adder 411 is provided in a stage preceding the subtractor 46. The adder 411 outputs a signal (referred to as corrected speed instruction), obtained by adding the speed instruction output from the position controller 41 and the speed FF signal output from the FF controller 5. The corrected speed instruction is input into the subtractor 46. Note that in a case where there is no speed FF signal, the speed instruction output from the position controller 41 is input into the subtractor 46. Speed feedforward control is performed by performing such speed control according to the corrected speed instruction.

A subtractor 47 is provided in a stage preceding the current controller 43. The torque instruction and a current instruction output from the current controller 43 are input into the subtractor 47. The subtractor 46 calculates a deviation (one example of difference information) between the torque instruction and a current instruction, and the deviation is input into the current controller 43. The current controller 43 performs P control, for example, and multiplies the deviation by a predetermined torque proportional gain to calculate the current instruction. Current according to the current instruction is supplied to the motor 2.

Although not illustrated, the current controller 43 includes a current detector that detects the current instruction supplied to the motor 2, and the current instruction detected by the current detector is fed back to the subtractor 47. Note that the current controller 43 includes a filter concerning the torque instruction (first-order lowpass filter) and one or multiple notch filters, and has, as a control parameter, a cutoff frequency and the like concerning the performance of the filters.

The adder 412 is provided in a stage preceding the subtractor 47. The adder 412 outputs a signal (referred to as corrected torque instruction) obtained by adding the torque instruction output from the speed controller 42 and the torque FF signal output from the FF controller 5. The corrected torque instruction is input into the subtractor 47. Note that in a case where there is no torque FF signal, the torque instruction output from the speed controller 42 is input into the subtractor 47. As has been described, the servo control system 1 includes a feedforward system using the FF controller 5, and can perform feedforward control on speed and torque.

OPERATION EXAMPLE

Figure 2:
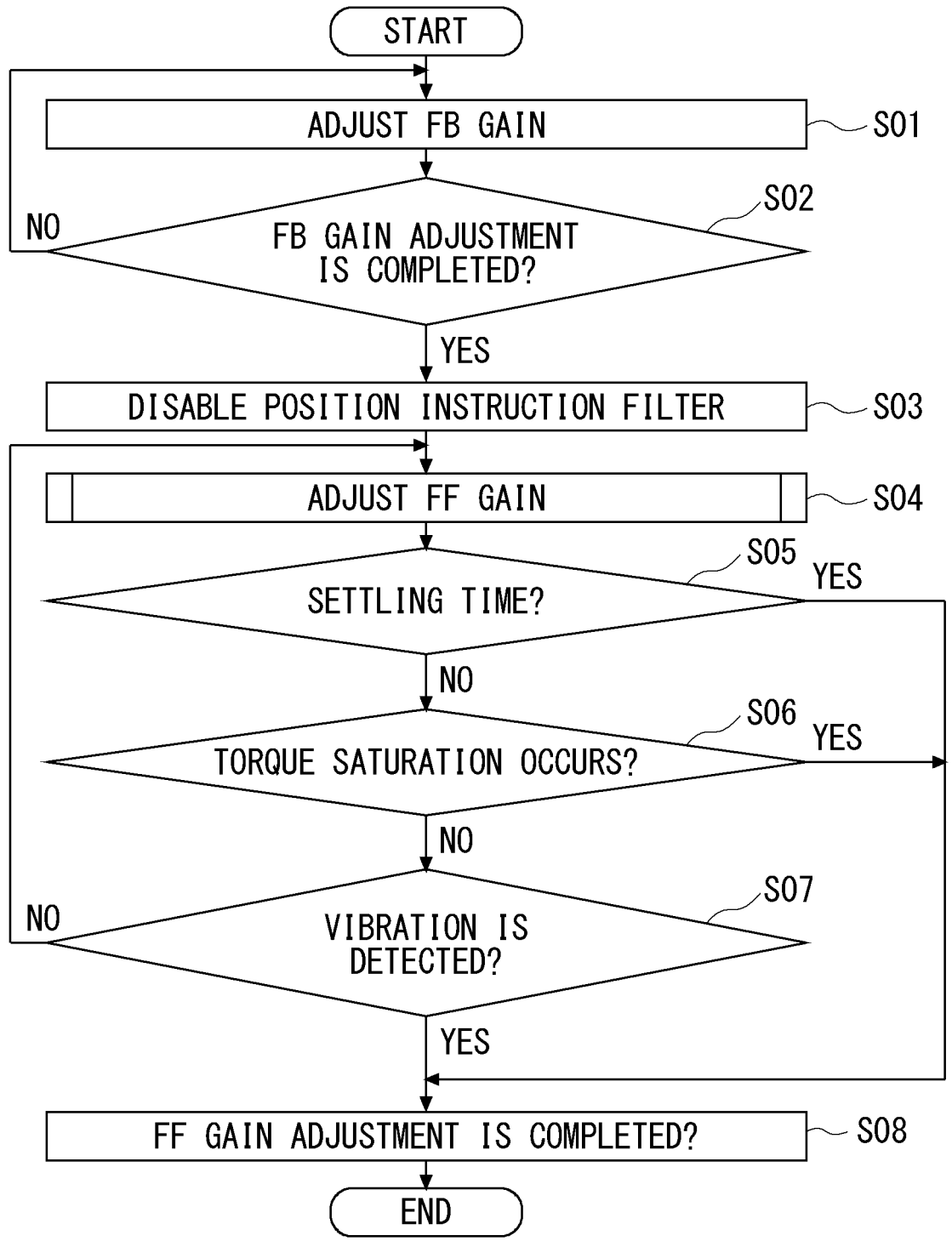
FIG. 2 is a flowchart illustrating the procedure of servo control by the motor control system.

FIG. 2 is a flowchart describing an operation example of the servo control system 1. In the following operation example, it is assumed that the FB gain and the FF gain are adjusted manually by the operator by using the PC 20. Note, however, that the FB gain and the FF gain may be adjusted automatically. Additionally, while an example is illustrated in which the FB gain and the FF gain are adjusted by using the PC 20, an adjustment mechanism of the FB gain and the FF gain may be provided in the servo driver 4 and the PLC 10.

In FIG. 2, in S01, the FF controller 5 is inactive, and the FB gain (aforementioned position proportional gain, speed integral gain, speed proportional gain, torque proportional gain) used by the FB controller 4A is adjusted by using the PC 20. The FB gain can be increased and decreased in a stepwise manner. For example, assuming that the time required to obtain a detected position of the controlled object 11 for one position instruction input is one cycle, the FB gain is raised in a stepwise manner according to the location deviation in one, or two or more predetermined number of cycles. When an FB gain adjustment completion condition such as rising of the FB gain to a predetermined value is satisfied (YES in S02), adjustment of the FB gain is completed.

When adjustment of the FB gain is completed, a control signal for disabling a position instruction filter 8 is supplied from the PC 20 to a filter controller 9, and the filter controller 9 disables the position instruction filter 8 (S03). The servo control system 1 of the embodiment includes the position instruction filter 8 and the filter controller 9 as optional configurations. The filter controller 9 sets the time constant of the position instruction filter 8, and selects a characteristic of the position instruction filter 8. Additionally, the filter controller 9 disables or enables the position instruction filter 8 according to a control signal supplied from the PC 20. By selecting the characteristic of the position instruction filter 8, soft start processing is performed on the pulse of position instruction, and smooth acceleration and deceleration can be performed. However, when performing feedforward control, the characteristic of the position instruction filter 8 may become a hindrance from the viewpoint of improving trajectory trackability. Hence, when adjustment of the FB gain is completed and adjustment of the FF gain is to be started, the position instruction filter 8 is disabled.

In S04, the FF gain is adjusted. The FF gain can be increased and decreased in a stepwise manner, and at the start of adjustment of the FF gain, a predetermined FF gain initial value is set. The initial value is 0%, for example, but a value larger than 0% may be set as the initial value. In the embodiment, the speed FF gain and the torque FF gain are determined as the FF gain, and the FF controller 5 is capable of supplying the speed FF signal and the torque FF signal to the FB controller 4A. Different initial values may be set for the speed FF gain and the torque FF gain.

Figure 3:
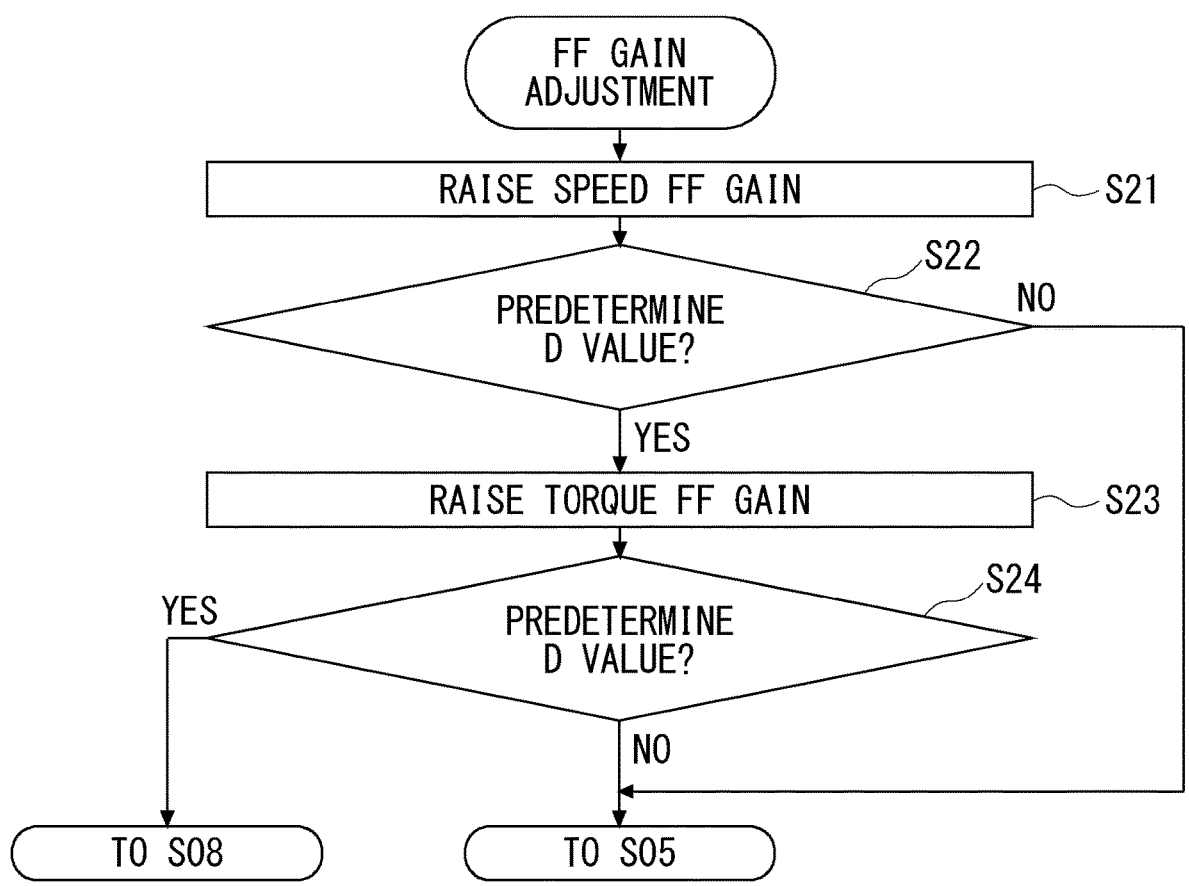
FIG. 3 is a flowchart illustrating one example of feedforward gain adjustment.

FIG. 3 is a flowchart illustrating one example of FF gain adjustment. In S21, the speed FF gain is raised by one level. In S22, if the speed FF gain is a predetermined value, adjustment of the speed FF gain is completed and the torque FF gain is raised by one level (S23). In S24, it is determined whether or not the torque FF gain is a predetermined value. If the value of the torque FF gain is lower than the predetermined value (NO in S24) the processing proceeds to S05, and if the torque FF gain is the predetermined value the processing proceeds to S08 and adjustment of the FF gain is completed.

The predetermined value of the speed FF gain and the predetermined value of the torque FF gain used in the determination in FF gain adjustment are a limit value (maximum level), for example. Note, however, that a value of a lower level may be set as the predetermined value. As described above, in the embodiment, the speed FF gain is adjusted before adjustment of the torque FF gain. Adjustment of speed gain is less likely to generate vibration than adjustment of torque gain. Hence, it is desirable that the speed FF gain be adjusted first from the viewpoint of improving trajectory trackability. Additionally, the servo driver 4 can be expected to follow the speed instruction more reliably. Note that it is also possible to perform control so as to simultaneously raise the speed FF gain and the torque FF gain by the same amount. In this case, since the speed FF gain and the torque FF gain are adjusted at the same timing, it is possible to avoid complexity of adjustment and save time.

The deviation (error) between a target value of the position instruction and the detected position is monitored by the PC 20, for example, and it is determined whether the error is within a predetermined range (referred to as setpoint) and in a stable state (whether settling time has passed) (S05). The user is notified of the passage of the settling time by the PC 20, and upon receipt of the notification, the user completes the FF gain adjustment (S08). Note that the PC 20 includes unillustrated notification devices such as a display, a speaker, and a lamp, and sends a signal or notification regarding the settling time to the operator by displaying information on the display, outputting sound from the speaker, or lighting or flashing the lamp, for example.

In S06, it is determined whether or not torque applied to the controlled object 11 is saturated. The servo driver 4 of the embodiment includes a torque saturation detector 6. The torque saturation detector 6 is capable of receiving a power signal from the servo driver 4 and detecting torque saturation during the operation of the controlled object 11. The torque saturation detector 6 detects torque saturation when the torque obtained from the current instruction exceeds a limit value of the torque of the motor 2. Note, however, that other detection methods of torque saturation can be selected as appropriate. Upon detection of torque saturation, the torque saturation detector 6 inputs a torque saturation detection signal to the PC 20. A tool (software) for detecting the torque saturation detection signal and a later-mentioned vibration detection signal is installed in the PC 20, and upon receipt of the torque saturation detection signal, the tool stops (completes) adjustment of the FF gain (S08). This is because a further increase in the FF gain does not contribute to improvement in trajectory trackability. Note that when stopping FF gain adjustment by detecting torque saturation, the magnitude of the FF gain may be reduced by one, or two or more predetermined levels. Additionally, upon receipt of the torque saturation detection signal, the PC 20 notifies the operator of information indicating occurrence of torque saturation by showing on the display, outputting sound from the speaker, lighting or flashing the lamp, for example.

In S07, it is determined whether vibration is detected during stoppage of the operation of the controlled object 11. The servo driver 4 includes a vibration detector 7. The vibration detector 7 detects vibration during stoppage of the operation of the controlled object 11. Specifically, the vibration detector 7 converts the speed deviation into torque, and detects vibration by comparing the converted value with a threshold. The vibration can be detected by the value converted into torque or by the speed deviation. Upon detection of vibration, the vibration detector 7 inputs a vibration detection signal into the PC 20. Upon receipt of the vibration detection signal, the aforementioned tool of the PC 20 stops (completes) adjustment of the FF gain (S08). Since detection of vibration is an undesirable situation from the viewpoint of improving trajectory trackability, the FF gain is not raised any further. Note that when stopping FF gain adjustment by detecting vibration, the magnitude of the FF gain may be reduced by one, or two or more predetermined levels. Additionally, upon receipt of the vibration detection signal, the PC 20 notifies the operator of the detection of vibration by showing on the display, outputting sound from the speaker, lighting or flashing the lamp, for example.

<Effect of Embodiment>

According to the embodiment described above, the FF gain is adjusted after adjusting the FB gain. With this method, it is possible to perform servo control with an FB gain and an FF gain of desired magnitudes (balanced FB gain and FF gain). Accordingly, it is possible to improve trajectory trackability and increase the robustness of the servo control system 1.

Additionally, stoppage or completion of FF gain adjustment in the embodiment is determined not based on the deviation between the target value and the output of the controlled object 11, but on torque saturation, vibration detection, and passage of settling time. Hence, it is possible to raise the FF gain to the limit within the range of no torque saturation and vibration detection, and achieve a favorable trajectory trackability. Additionally, by adjusting the speed FF gain before the torque FF gain, occurrence of vibration can be curbed. The configuration of the embodiment described above is one example, and the present invention is not limited to the configuration of the embodiment. The configuration of the embodiment can be changed as appropriate without departing from the object of the present invention.

<Supplement>

A servo control method including a step of adjusting a feedback gain used in feedback control of a controlled object (11) performed based on difference information between a target value concerning an instruction and a feedback signal from the controlled object, so that operation of the controlled object (11) follows the instruction, and a step of adjusting a feedforward gain used in feedforward control of the controlled object after the adjustment of the feedback gain.

REFERENCE SIGNS LIST 1 servo control system
2 motor
3 load device
4 servo driver
4A feedback controller
5 feedforward controller 6 torque saturation detector
7 vibration detector
8 position instruction filter
9 filter controller
10 PLC
11 controlled object
20 personal computer (PC)
41 position controller
42 speed controller
43 current controller
44 speed detector
45, 46, 47 subtractor
411, 412 adder

The invention claimed is:

1. A servo control method comprising
a step of adjusting a feedback gain used in feedback control of a controlled object, the feedback control being performed based on difference information between a target value concerning an instruction and a feedback signal from the controlled object, so that the controlled object is operated by following the instruction, and
a step of adjusting a feedforward gain used in feedforward control of the controlled object after the adjustment of the feedback gain, wherein
the adjustment of the feedforward gain is stopped when torque applied to the controlled object is saturated during the operation of the controlled object.

2. A servo control method comprising
a step of adjusting a feedback gain used in feedback control of a controlled object, the feedback control being performed based on difference information between a target value concerning an instruction and a feedback signal from the controlled object, so that the controlled object is operated by following the instruction, and
a step of adjusting a feedforward gain used in feedforward control of the controlled object after the adjustment of the feedback gain, wherein
the adjustment of the feedforward gain is stopped when vibration is detected during stoppage of the controlled object.

3. A servo control method comprising
a step of adjusting a feedback gain used in feedback control of a controlled object, the feedback control being performed based on difference information between a target value concerning an instruction and a feedback signal from the controlled object, so that the controlled object is operated by following the instruction, and
a step of adjusting a feedforward gain used in feedforward control of the controlled object after the adjustment of the feedback gain, wherein
in a case where speed control and torque control are performed regarding the controlled object, a feedforward gain concerning the torque control is adjusted after adjusting a feedforward gain concerning the speed control.

* * * * *